United States Patent [19]

Widiger, Jr. et al.

[11] 4,321,331
[45] Mar. 23, 1982

[54] HIGH DENSITY ION EXCHANGE RESINS FROM HALOALKYLATED AROMATIC POLYMER

[75] Inventors: Alexander H. Widiger, Jr.; Osro W. Randall, III; Steven M. Pulver, all of Midland, Mich.

[73] Assignee: The Dow Chemical Company, Midland, Mich.

[21] Appl. No.: 958,451

[22] Filed: Nov. 6, 1978

[51] Int. Cl.³ ............................ C08F 8/32; C08F 8/30; C08F 8/22; C08F 8/20
[52] U.S. Cl. ............................ 521/32; 423/7; 426/271; 521/31; 525/357; 525/378; 525/379
[58] Field of Search ............ 526/42; 521/31, 32; 525/355, 378, 379, 357, 359

[56] References Cited

U.S. PATENT DOCUMENTS 3,812,061 5/1974 Barrett .................................. 521/32
3,899,472 8/1975 Aya et al. ............................ 526/42

FOREIGN PATENT DOCUMENTS 1169122 11/1964 Fed. Rep. of Germany ...... 525/355
2218126 10/1973 Fed. Rep. of Germany ...... 521/31
50-29755 9/1975 Japan .................................. 525/355
767216 11/1977 South Africa ....................... 521/31
765165 3/1978 South Africa .

OTHER PUBLICATIONS

Dow Chemical Co. Internal Communication–R. M. Wheaton–Jun. 18, 1948.
Chem. Abstracts, vol. 61, entry 2027–Wintersberg 1964.
Chem. Abstracts, vol. 78, 1973, entry 148658b, Ito et al.

Primary Examiner—C. A. Henderson

[57] ABSTRACT

High density ion exchange resins are prepared from cross-linked, haloalkylated monovinylidene aromatic polymers which have been halogenated in the presence of a Friedel-Crafts catalyst. For example, a cross-linked chloromethylated polystyrene brominated in the presence of ferric chloride ($FeCl_3$) may be subsequently aminated to form a high density anion exchange resin useful in thick process slurries such as those employed in uranium recovery.

19 Claims, No Drawings

HIGH DENSITY ION EXCHANGE RESINS FROM HALOALKYLATED AROMATIC POLYMER

BACKGROUND OF THE INVENTION

This invention relates to a method for increasing the density of cross-linked haloalkylated monovinylidene aromatic polymers and to methods for preparing high density ion exchange resins therefrom.

Ion exchange resins are normally solid materials which generally carry exchangeable ions. Due to their ability to exchange ions in a liquid without substantial alteration of the solid resin's structure, they are widely used in recovery processes such as uranium recovery and in waste treatment such as the removal of undersirable components from water.

Generally, the most effective ion exchange resins are substantially insoluble but swellable to a limited degree in water and are resistant to physical deterioration such as excessive swelling or shattering. Moreover, in many applications, particularly when employed in continuous operations such as uranium recovery or sugar processing, the resin's density is advantageously sufficiently high to assure initimate and continuous contact between the resin and the ion containing liquids and to sink the resin in said liquids, which are generally thick slurries or pulps.

Conventionally, many ion exchange resins are prepared by (1) haloalkylating a copolymer of (a) a monovinylidene aromatic such as styrene and (b) a cross-linking agent which is generally a polyvinylidene aromatic such as divinylbenzene in the presence of a Friedel-Crafts catalyst and (2) attaching ion active exchange groups to the resulting haloalkylated polymer. For example, an anion exchange resin is prepared by aminating the haloalkylated polymer. See, *Ion Exchange* by F. Helfferich, published in 1962 by McGraw-Hill Book Company, New York. Unfortunately, these anion exchange resins, without modification, possess relatively low densities, thereby tending to float in thicker slurries or pulps.

Methods for increasing the density of such resins are known in the art. For example, U.S. Pat. Nos. 2,769,788 and 2,809,943 disclose methods for incorporating inert, finely divided solid materials having a high density, i.e., 2.5 g/cc or higher, into copolymer beads of monovinylidene and polyvinylidene aromatic compounds. Unfortunately, the ion exchange resin beads prepared by such methods exhibit surface irregularities, excessive spalling, and low mechanical stability, thereby, tending to break when employed in a continuous operation.

To increase the mechanical stability of high density ion exchange resin beads, German Pat. No. 2,218,126 proposes preparing the resins using a non-ionic substituted styrene, such as monochlorostyrene, as the monovinylidene aromatic compound. Unfortunately, non-ionic substituted styrenes are relatively expensive and of limited availability.

In view of these stated deficiencies in the prior art methods for preparing ion exchange resins having higher densities, it would be highly desirable to provide an improved method for preparing such resins.

SUMMARY OF THE INVENTION

Accordingly, in one aspect, the present invention is a method for increasing the density of a cross-linked, haloalkylated, monovinylidene aromatic polymer. In said method, the haloalkylated polymer is contacted with a halogenating agent and a Friedel-Crafts catalyst, under conditions sufficient to cause aromatic halogenation of the polymer, such that the density of said polymer is increased without substantially reducing the number of haloalkyl groups pendant thereto.

In another aspect, the present invention is an improved method for preparing high density ion exchange resins by attaching to said halogenated polymer suitable ion active exchange groups.

In yet another aspect, the present invention is an ion exchange resin prepared by the described method.

Surprisingly, the halogenation of the haloalkylated polymer by the method of this invention causes an increase in the density of the haloalkylated polymer without substantially reducing the number of haloalkyl groups on said polymer by coincident methylene bridging. Therefore, ion active exchange groups are easily attached to the halogenated polymer.

As such, the halogenated polymers are useful precursors in the preparation of high density gel and macroporous anion exchange, chelate, and enzyme support type resins. These high density resins are useful for removing electrolytes from water and other liquids in such operations as desalting, demineralizing and other purification processes. The high density anion exchange resins are particularly useful in the removal of uranium from solution and the removal of ash and acidic impurities from sugar solutions.

DETAILED DESCRIPTION OF PREFERRED EMBODIMENTS

In general, the cross-linked, haloalkylated, monovinylidene aromatic polymer is the haloalkylated product of a cross-linked addition copolymer derived from a polymerizable monovinylidene aromatic compound and a cross-linking agent copolymerizable therewith. In the haloalkylated polymer, the halogen atom of the haloalkyl group is attached to a benzyl carbon atom, i.e., that carbon atom alpha to the aromatic nucleus, of the monovinylidene aromatic compound.

Kinds of polymerizable monovinylidene aromatic compounds, cross-linking agents, catalysts, aqueous polymerization media and methods for preparing the cross-linked addition copolymers as granules or in spheroidal bead form of the gel and macroporous type are well known in the art and reference is made thereto for the purposes of this invention. Illustrative of such are U.S. Pat. Nos. 2,960,480; 2,788,331; 2,642,417; 2,614,099; 2,591,573 for conventional gel type materials and U.S. Pat. Nos. 3,637,535; 3,549,562 and 3,173,892 for the more porous materials, i.e., the so-called macroporous material, all of which are hereby incorporated by reference. Of the polymerizable monovinylidene aromatic compounds presented in such references styrene; monoalkyl substituted styrenes such as vinyltoluene and ethyl vinylbenzene; and vinyl naphthalene are preferred in this invention; with styrene and vinyl naphthalene being the most preferred. Preferred cross-linking agents include divinylbenzene, divinyl toluene, divinyl xylene, divinyl naphthalene, ethylene glycol dimethacrylate and diallyl succinate; with divinylbenzene and ethylene glycol dimethacrylate being the most preferred.

Methods for haloalkylating the cross-linked addition copolymers and the haloalkylating agents employed in such methods are also well known in the art and reference is made thereto for the purposes of this invention.

Illustrative of such are U.S. Pat. Nos. 2,642,417; 2,960,480; 2,597,492; 2,597,493; 3,311,602 and 2,616,877 and *Ion Exchange*, by F. Helfferich, published in 1962 by McGraw-Hill Book Company, New York, all of which are hereby incorporated by reference. Of the haloalkylating agents presented therein, the halomethylating agents such as bromomethyl methyl ether, chloromethyl methyl ether and a mixture of formaldehyde and hydrochloric acid are preferred, with chloromethyl methyl ether being especially preferred.

Alternatively, the cross-linked, haloalkylated monovinylidene aromatic polymer is a cross-linked copolymeric product of a polymerizable cross-linking agent, e.g., divinylbenzene and a polymerizable haloalkylated monovinylidene aromatic, e.g., vinylbenzyl chloride, wherein the halogen atom of the haloalkyl group is attached to a benzyl carbon atom. As an example of such polymer and its method of preparation, reference is made to U.S. Pat. No. 2,992,544 (which is hereby, incorporated by reference) wherein a chloromethylstyrene and a polyvinyl aromatic hydrocarbon cross-linking agent are copolymerized to form a cross-linked chloromethylated polystyrene.

Preferably, the polymers of this invention are prepared in spheroidal bead form, preferably with an average diameter from about 0.04 to about 2.4 mm, with an average diameter between about 0.3 and 1.2 mm being more preferred.

In the practice of this invention, prior to halogenation, the haloalkylated polymer is advantageously washed to remove any by-products produced during haloalkylation and subsequently dried. Typically, a wash with a lower alkanol, e.g., methanol, followed by a water wash and subsequent drying is advantageously employed. Preferably, essentially all the water from this wash is removed by the drying. Alternatively, the haloalkylated polymer is simply filtered from the reaction solvent in which the haloalkylation was conducted. In such case, drying the polymer prior to halogenation is not normally desirable.

The halogenating agents useful in the practice of this invention are those compounds which in the presence of a Friedel-Crafts catalyst generate an ion of chlorine, bromine or iodine. Representative of such compounds are the gases or liquids of said halogens; the gases and liquids of mixed halogens such as bromine chloride and iodine chloride and other halogen containing compounds capable of generating the suitable halogen ion such as a suitable halogen containing solid or liquid such as N-bromo-acetamide and N-bromo-succinimide. Preferably a bromine or bromine chloride liquid is employed as the halogenating agent. Due to the generally lower temperatures and times required for halogenation, bromine chloride is the most preferred halogenating agent.

Suitable Friedel-Crafts catalysts are conventional Friedel-Crafts catalysts such as those disclosed in *Friedel-Crafts Chemistry* by G. A. Olah, published in 1973 by John Wiley and Sons, New York and include acidic halides such as $AlCl_3$, $SbCl_3$, $ZnCl_2$ and $FeCl_3$; metal alkyls and alkoxides such as aluminum and boron alkyl; proton acids such as sulfuric acid; acidic oxides and sulfides (acidic chalcides) and the like. Preferred of the Friedel-Crafts catalysts are the proton acids and the acid halides with ferric chloride ($FeCl_3$), zinc chloride ($ZnCl_2$) and aluminum chloride ($AlCl_3$) being especially preferred.

The halogenating agent and Friedel-Crafts catalyst are employed in amounts such that under conditions sufficient to cause aromatic halogenation of the haloalkylated polymer, e.g., those conditions hereinafter described, the density of said polymer is increased without substantially reducing the number of haloalkyl groups pendant to the polymer.

By "increase the density of the polymer" it is meant that the density is increased by an amount measurable using conventional test methods, e.g., ASTM D-792-60T. Preferably, the density increase is at least about 5 percent, more preferably at least about 10 percent, when compared to an identical haloalkylated polymer which has not been halogenated. By way of example, a haloalkylated polymer having a density of 1.100 g/ml exhibits a 5 percent increase in density when the density following halogenation is 1.155 g/ml.

The number of haloalkyl groups pendant to the polymer are not substantially reduced when the ratio of (1) the number of haloalkyl groups pendant to the halogenated polymer ($N_a$) to (2) the number of haloalkyl groups pendant to said polymer prior to halogenation ($N_b$) is at least about 0.6. Advantageously, said ratio is at least about 0.7, with a ratio of 0.8 being preferred and a ratio of 0.85 being most preferred. For the purposes of this invention, said ratio is determined by conventional techniques such as by the method outlined in Note 8 of Table I.

Typically, the amount of the halogenating agent and Friedel-Crafts catalyst will vary depending on the density increase desired, the particular reactants, i.e., haloalkylated polymer, halogenating agent and Friedel-Crafts catalyst, and the reaction conditions.

In general, the halogenating agent is advantageously employed at from about 30 to about 150 mole percent, preferably from about 50 to about 125 mole percent, with said mole percents being based on the total moles of the monovinylidene aromatic compound employed in preparing the haloalkylated polymer. Most preferably, the halogenating agent is used in stoichiometric amounts, i.e., about one mole of the halogenating agent is used for each mole of the monovinylidene aromatic.

Generally, the Friedel-Crafts catalyst is advantageously employed at from about 0.5 to about 100 mole percent, preferably from about 2 to about 50 mole percent, most preferably from about 5 to about 25 mole percent, with said mole percents being based on the total number of moles of the monovinylidene aromatic monomer employed in preparing the polymer.

The haloalkylated polymer is advantageously halogenated by contacting said polymer with the hereinbefore specified amounts of the halogenating agent and Friedel-Crafts catalyst at conditions sufficient to halogenate the polymer. Although the halogenation may be conducted neat, advantageously, the polymer is dispersed and swollen by a reaction diluent and the halogenation conducted while the polymer is in this swollen state. Reaction diluents suitably employed include organic solvents which are less reactive to the halogen ion than the polymer, and which are capable of swelling the polymer to some limited degree. Representative of such solvents are methylene chloride, carbon tetrachloride, tetrachloroethylene, ethylene dichloride and the like, with methylene chloride being preferred. When used, the solvent is employed in amounts between about 50 and about 1200 weight percent, preferably between about 100 and about 600 weight percent, based on the total polymer weight.

Advantageously, the halogenation is conducted at temperatures from about −10° C. to about 125° C. (with the upper temperature generally being limited by the boiling point of the solvent) with temperatures between about 5° C. and 80° C. being preferred.

In conducting the halogenation, although the order of addition of the reactants is not critical; advantageously, the halogenating agent is added to a mixture of the organic solvent, the polymer and the catalyst. During this addition, the mixture is advantageously maintained within the hereinbefore specified temperature range and agitated sufficiently to maintain an essentially homogeneous mixture of the reactants. The addition of the halogenating agent to the mixture may be continuous, batchwise or incremental, i.e., added as shots in two or more increments, with incremental or continuous adding being preferred in order to control the heat generated in the mixture during the addition of the halogenating agent thereto. Most preferably, a continuous addition of from about 5 minutes to 2 hours is employed.

At the specified temperatures, halogenation generally requires a reaction time from about 15 minutes to about 30 hours. Preferably, reaction times from about 30 minutes to about 24 hours, more preferably from about 1 hour to about 8 hours, are employed. Said reaction times include any time required for the addition of the halogenating agent to the reaction mixture.

Following halogenation, the reactants are adjusted to ambient temperatures and any excess halogen, i.e., unreacted halogenating agent, neutralized, e.g., contacted with sodium bisulfite. The resulting high density halogenated polymer is advantageously washed with a volatile, organic liquid such as acetone, methanol, methylene chloride, tetrahydrofuran, 1,2-dichloroethane or the like to remove residual catalyst, halogenating agent or the like.

The high density halogenated polymer may then be converted to a high density anion exchange resin or high density chelate resin using techniques well known in the art for converting conventional cross-linked, haloalkylated monovinylidene aromatic polymers to such resins.

Generally, anion exchange resins are prepared by attaching anion active exchange groups to the halogenated polymer by contacting said polymer with a compound which is reactive with the halogen of the haloalkyl group and which upon reaction forms an anion active exchange group. As mentioned, such compounds and methods for preparing anion exchange resins therefrom, i.e., weak base resins and strong base resins, are well known in the art and U.S. Pat. Nos. 2,632,000; 2,616,877; 2,642,417; 2,632,001; 2,992,544 and *Ion Exchange* by F. Helfferich, published in 1962 by McGraw-Hill Book Company, New York (all of which are hereby incorporated by reference) are illustrative thereof. Typically, a weak base resin is prepared by contacting the halogenated polymer with ammonia, a primary amine or a secondary amine. Representative primary and secondary amines include methylamine, ethylamine, butylamine, cyclohexylamine, dimethylamine, diethylamine and the like. Such method generally comprises heating, with reflux, a mixture of the polymer and at least a stoichiometric amount of the aminating agent, i.e., ammonia or the amine, to a temperature sufficient to react the aminating agent with the halogen atom attached to the carbon atom alpha to the aromatic nucleus. A dispersing agent such as water, ethanol or the like is optionally employed. Advantageously, temperatures between about 25° and 150° C. are employed for the reaction and the reaction is generally complete in from 2 to 6 hours at reflux temperature. Strong base ion exchange resins are prepared in a similar manner using tertiary amines such as trimethylamine, triethylamine, tributylamine, dimethylisopropanolamine, ethylmethylpropylamine or the like as the aminating agent.

Generally, chelate resins are prepared from the halogenated polymer by attaching thereto chelate active groups, e.g., carboxyl groups. Illustrative of the well known methods for preparing chelate resins is U.S. Pat. No. 2,888,441 wherein the halogenated polymer is aminated by a technique hereinbefore described and the aminated copolymer subsequently reacted with a suitable carboxyl containing compound, e.g. chloroacetic acid. Alternatively, the haloalkylated polymer can be directly reacted with (1) a suitable amino acid such as diiminoacetic acid or glycine (see, for example, U.S. Pat. Nos. 2,875,162 and 3,337,480) or (2) an aminopyridine such as 2-picolylamine and N-methyl-2-picolylamine (see U.S. Pat. No. 4,031,038) to form a chelate resin.

The following examples are presented to illustrate the invention and should not be construed to limit its scope. All percentages and parts in the examples are by weight unless otherwise indicated.

EXAMPLE 1

To a three-necked, 3 l. glass flask equipped with an agitator, reflux means, thermometer and heating and cooling means is added 600 ml of dry methylene chloride and 100 g of dry chloromethylated polystyrene beads (gel type) having 1.8 percent divinylbenzene cross-linking agent copolymerized therein. This mixture is mildly agitated for about 30 minutes at 22° C. to allow the beads to swell in the methylene chloride. A 15.1 g sample of anhydrous antimony trichloride (about 0.1 mole of $SbCl_3$ per mole of styrene employed in preparing the copolymer) is added to the flask while the mixture is being mildly agitated. The added $SbCl_3$ is allowed to stir with the swollen beads for about 10 minutes. At this time, 53 g of liquid bromine (about 0.5 mole of bromine per mole of styrene employed in preparing the copolymer) is added dropwise to the flask over a period of about 45 minutes. During this addition the flask is maintained at about 22° C. After complete bromine addition, the flask is heated to about 40° C. The mixture is maintained at this temperature, with reflux, for an additional period of 4 hours following the bromine addition. After this time, the flask is cooled to ambient temperature, e.g., 22° C., and allowed to stand overnight. The excess bromine is washed with aqueous sodium bisulfite and the beads washed twice with 400 ml portions of methylene chloride.

The washed brominated beads are recovered by standard filtration techniques. These beads are aminated by transferring them to a three-necked 1 l. flask containing 400 ml of methylene chloride and 75 g of methanol. A 250 ml portion of a 25 percent aqueous solution of trimethylamine is added dropwise to the flask at 25° C. for a period of one hour. The flask is heated to 40° C. and the mixture therein allowed to reflux at this temperature for 4 hours. The methylene chloride is distilled off; adding deionized water at the same rate as the distillation of the methylene chloride. After complete distillation, the temperature of the flask is raised to 80° C. Upon reaching this temperature, sufficient amounts of a 5 percent aqueous solution of hydrochloric acid is added to the flask to acidify the beads. The beads are cooled and then washed with deionized water to a pH of about 6. The washed beads are recovered by conventional filtration techniques and denoted Sample No. 1.

of 1.8 resin volumes per minute. Samples 2, 4, 5 and 9 show a total uranium capacity of greater than 30 g $U_3O_8$/l. Sample No. 10 had a lower total uranium of about 20 g/l.; the lower capacity believed to be due to the high percent water contained in the beads.

TABLE I

| Sample No. | Friedel-Crafts Catalyst Type | Friedel-Crafts Catalyst Concentration % (1) | Bromine Concentration % (2) | Wet Volume Capacity meq/ml (3) | Dry Weight Capacity meq/g (4) | $H_2O$ In Beads, % (5) | Wet Density g/ml (6) | Density Increase % | Wt. % Br (7) | Ratio Na/Nb (8) |
|---|---|---|---|---|---|---|---|---|---|---|
| C* | — | — | — | .77 | 4.31 | 73.4 | 1.078 | — | — | — |
| 1 | $SbCl_3$ | .10 | 0.50 | 1.16 | 3.16 | 49.0 | 1.166 | 8.2 | 20.5 | .93 |
| 2 | $SbCl_3$ | .10 | 0.75 | 1.01 | 2.63 | 47.7 | 1.188 | 10.2 | 24.7 | .81 |
| 3 | $SbCl_3$ | .05 | 1.25 | .91 | 2.85 | 54.0 | 1.163 | 7.9 | 27.9 | .92 |
| 4 | $SbCl_3$ | .10 | 1.25 | 1.14 | 2.84 | 47.8 | 1.207 | 11.9 | 30.3 | .95 |
| 5 | $SbCl_3$ | .25 | 1.25 | 1.09 | 2.62 | 45.2 | 1.204 | 14.2 | 32.0 | .90 |
| 6 | $FeCl_3$ | .025 | 1.25 | 1.21 | 2.90 | 46.7 | 1.202 | 11.5 | 18.6 | .83 |
| 7 | $FeCl_3$ | .05 | 1.25 | 1.09 | 1.91 | 36.4 | 1.329 | 23.3 | 31.8 | .65 |
| 8 | $FeCl_3$ | .10 | 1.25 | 0.95 | 1.69 | 38.3 | 1.317 | 22.2 | 38.0 | .63 |
| 9 | $AlCl_3$ | .10 | 1.25 | 1.0 | 2.30 | 42.6 | 1.193 | 11.0 | 22.4 | .69 |
| 10 | $ZnCl_2$ | .10 | 1.25 | 0.70 | 3.24 | 67.7 | 1.093 | 1.42 | 23.0 | .97 |

(1) Concentration of the catalyst is reported as the moles of catalyst per mole of styrene employed in preparing the chloromethylated polystyrene beads.
(2) Concentration of bromine is reported as the moles of bromine per mole of styrene employed in preparing the chloromethylated polystyrene beads.
(3) Determination of the available anion exchange sites per unit volume which is measured by chloride titration with silver nitrate as described in DOWEX: Ion Exchange, published in 1964 by The Dow Chemical Company, pages 37 and 38.
(4) Determination of the available anion exchange sites per unit weight (dry) which is measured by chloride titration with silver nitrate as described in DOWEX: Ion Exchange, published in 1964 by The Dow Chemical Company, pages 37 and 38.
(5) Weight percent of water in the washed beads is the total weight percent of water retained by the beads based on the weight of the beads and the water.
(6) Wet density of the polymer beads as determined by ASTM method designated D792-60T.
(7) The weight percent bromine in each sample is determined by neutron activation analysis.
(8) Ratio Na/Nb = ratio of (1) the number of haloalkyl groups pendant to the halogenated copolymer, i.e., each of Sample Nos. 1–10, to (2) the number of haloalkyl groups pendant to an identical polymer which has not been halogenated, i.e., Sample No. C. In this example, said ratio is determined by a comparison of the total dry weight capacity of each Sample No. 1–10 with the total dry weight capacity of Sample No. C, correcting for a theoretical average molecular weight. The total dry weight capacity of each sample is found by conventional techniques, e.g., Note 4 of this Table, after each sample has been aminated with an excess amount, preferably at least about 1.5 times stoichiometric amounts, of trimethylamine at conditions which maximize amination of the haloalkyl groups, e.g., the amination conditions of this example and other conditions herein described. The theoretical average molecular weight of each sample is calculated using the formula:

$$MW = \left(\frac{WP_H}{AW_H} \cdot \frac{MW_R}{WP_R} \cdot AW_H\right) + MW_R$$

wherein MW is the theoretical average molecular weight of the sample; $WP_H$ is the weight percent of the halogen (in this example - bromine) attached to the halogenated haloalkylated polymer; $WP_R$ is the weight percent of the aminated haloalkylated polymer (not halogenated), i.e., $100 - WP_H$; $AW_H$ is the atomic weight of the halogen (in this example - 79.9) and $MW_R$ is the theoretical molecular weight of the aminated haloalkylated polymer as determined by the formula:
$MW_R = (MW_{XL} \cdot MP_{XL}) + (MW_{AMP} \cdot MP_{AMP})$
wherein $MW_{XL}$ and $MP_{XL}$ are, respectively, the molecular weight and mole percent of the cross-linking agent employed in preparing the haloalkylated polymer, and $MW_{AMP}$ and $MP_{AMP}$ are, respectively, the molecular weight and mole percent of the haloalkylated polymer following amination.
The ratio of Na/Nb is calculated from the dry weight capacities and the theoretical average molecular weights using the formula:
$$Na/Nb = \frac{DWC_a}{DWC_b} \times \frac{MW_a}{MW_b}$$
wherein $DWC_a$ and $DWC_b$ are the dry weight capacities of a halogenated sample (Sample Nos. 1–10) and a non-halogenated sample, i.e., the control (Sample No. C), respectively; and $MW_a$ and $MW_b$ are the theoretical average molecular weights of the halogenated samples and the non-halogenated sample, respectively.
Alternatively, the ratio of Na/Nb can be determined by conducting an elemental analysis for nitrogen on the aminated samples and using the formula:
$$Na/Nb = \frac{PN_a}{PN_b} \times \frac{MW_a}{MW_b}$$
wherein $MW_a$ and $MW_b$ are as hereinbefore defined and $PN_a$ and $PN_b$ are the mole percent nitrogen of the halogenated sample and the non-halogenated (control) sample, respectively.

In a similar manner, other high density anion exchange resin beads (Sample Nos. 2–10) are prepared using bromine and various catalysts in the proportions specified in the accompanying table. As a control, polystyrene beads having 1.8 percent divinylbenzene cross-linking agent copolymerized therein which has not been halogenated, is aminated in a similar manner (Sample No. C). Each sample is tested for wet volume capacity, dry weight capacity, percent water retained, density and the ratio of the number of haloalkyl groups following bromination to the number of haloalkyl groups prior to bromination (Na/Nb ratio). The results of this testing are recorded in Table I.

Several samples, i.e., Sample Nos. 2, 4, 5, 9 and 10, are also tested for uranium loading by converting the aminated beads to a sulfate form, and loading the converted beads with an aqueous solution of a known concentration of uranyl sulfate (0.18 g $U_3O_8$, 1.5 g $Fe^{+++}$, 0.2 g $P_2O_5$, 0.6 g $Cl^-$ and 2.5 g $H_2SO_4$ per l. of solution) by downflowing 450 resin volumes of this solution at a rate As evidenced by the data reported in the foregoing table, the density of a cross-linked, haloalkylated, monovinylidene aromatic polymer can be increased by the methods of this invention without substantially reducing the number of haloalkyl groups pendant thereto as evidenced by the Na/Nb ratio. The type and amount of the Friedel-Crafts catalyst and the amount of the halogenating agent, i.e., bromine, are shown to substantially affect the properties, e.g., the density and ratio of Na/Nb of the halogenated polymer.

EXAMPLE 2

To a 3 l. flask similar to the flask employed in Example 1 is added 600 ml of dry methylene chloride, 28.5 g of anhydrous antimony trichloride and 73.6 g of dry macroporous chloromethylated polystyrene beads having 6 percent divinylbenzene copolymerized therein, said beads being polymerized with 44 percent, by weight, of an isooctane diluent in the monomer phase to impart porosity thereto. The mixture is mildly agitated for about 30 minutes at 18° C. to allow the beads to swell in the methylene chloride. A 92 g portion of bromine is then added dropwise to the agitated mixture for a period of about 40 minutes, while maintaining the flask temperature at about 18° C. After the entire portion of bromine has been added, the flask is heated to 40° C. and maintained at this temperature, with reflux, for about 4 hours. At the end of this period, the flask is cooled to about 18° C.

To wash the brominated beads, 300 ml of water containing sufficient amounts of sodium bisulfite to neutralize the unreacted bromine is added to the flask. The methylene chloride remaining in the flask is then distilled off. Following this distillation, the beads are withdrawn from the flask and the water decanted off. The beads are then washed with 200 ml of methyl alcohol and the washed beads recovered by filtration.

The recovered beads, 400 ml of methylene chloride and 300 ml of a 25 percent solution of trimethylamine is placed in a 3 l. flask equipped with reflux means, agitator, thermometer and heating and cooling means. This mixture is heated to about 40° C. and allowed to reflux at this temperature for about 3 ¾ hours. At this time, sufficient amounts of a 5 percent aqueous solution of hydrochloric acid is added to adjust the pH of the resulting mixture to about 1. The flask is then heated to about 70° C. to distill off the methylene chloride, deionized water being added at the same rate as the methylene chloride is distilled off. The resulting beads are a macroporous strong base ion exchange resin having a wet volume capacity of 0.904 meq/ml and a dry weight capacity of 3.09 meq/q. They contain 60% water and have a wet density of about 1.076 g/ml, which is about a 6 percent increase in density over similar macroporous chloromethylated polystyrene beads which were not halogenated in accordance with the practice of this invention. By the methods of this invention, the ratio of $Na/N_b$ is calculated to be about 0.81.

EXAMPLE 3

To a 3 l. flask similar to the flask employed in Example 1 is added 250 g of methylene chloride and 50 g of chloromethylated polystyrene beads having 1.8 percent divinylbenzene copolymerized therein. This mixture is mildly agitated at 19° C., i.e., ambient temperature, for about one hour to allow the beads to swell in the methylene chloride. At the end of this time, 2.7 g of ferric chloride is added to the mixture. Immediately thereafter, a solution of 250 g of methylene chloride and 42.9 g of a bromine chloride halogenating agent is added to the flask by continuous addition which takes about 6 minutes. During said addition, the temperature of the mixture is maintained at 20° C. The mixture is maintained at 20° C. for about an additional 2 hours. At the end of this period, the beads are recovered by filtration.

The filtered beads are washed twice with 200 ml of methylene chloride and then are placed in a column and chromatographically washed with methylene chloride until the eluant is clear.

The washed beads are aminated with trimethylamine in a manner similar to the amination procedure of Example 1.

The aminated beads are found to have a dry weight capacity of 3.29 meq/g, a water retention capacity of 60.2 percent and a density of 1.1441, which is about a 6 percent increase over similar aminated beads which have not been halogenated by the method of this invention. By the methods of this invention, the ratio of $Na/N_b$ is found to be about 1.02.

EXAMPLE 4

Polystyrene beads having 1.5 percent divinylbenzene copolymerized therein are chloromethylated by conventional techniques using chloromethyl methyl ether. Upon completion of the chloromethylation reaction, the beads are filtered from the reaction medium. The filtered beads are found to contain about 50 percent liquid (reaction medium) with about 74 percent of this liquid being chloromethyl methyl ether.

About 30 g of these "wet" beads are added to a 3.1. flask similar to the flask employed in Example 1. To the flask is also added 225 ml of methylene chloride. This mixture is mildly agitated for 1 hour at 19° C., i.e., ambient temperature, to allow the beads to swell. At the end of this period, 0.8 g of ferric chloride is added to the flask. Shortly thereafter, a solution of 150 ml of methylene chloride and 20.3 g of bromine chloride is added continuously to the flask. The addition takes about 6 minutes. During said addition and for an additional 2 hours the temperature of the flask is maintained at 19° C. At the end of this period the beads are recovered by filtration and washed repeatedly with methylene chloride. The beads are found to contain about 10.5 percent bromine.

The resulting beads are aminated with trimethylamine in a manner similar to the procedure of Example 1. The resulting aminated polymer is a strong base ion exchange resin having a dry weight capacity of 3.78 meq/g containing 70.2% water and having a density of 1.078 g/cc. When compared to a similar polymer which has not been brominated, (dry weight capacity=4.37 meq/g, $\rho = 1.041$ g/cc), the $Na/N_b$ ratio is found to be 0.95.

What is claimed is:

1. A method for increasing the density of a cross-linked haloalkylated, monovinylidene aromatic polymer, said method comprising the step of contacting the haloalkylated polymer with a brominating agent and a Friedel-Crafts catalyst under conditions sufficient to brominate the haloalkylated polymer such that the density of the haloalkylated polymer is increased and the ratio of the number of haloalkyl groups pendant to the polymer following the halogenation to the number of haloalkyl groups pendant to said polymer prior to halogenation is at least about 0.6.

2. The method of claim 1 wherein the cross-linked haloalkylated, monovinylidene aromatic polymer is a copolymer of styrene, vinyltoluene, ethylvinylbenzene or vinyl naphthalene and divinylbenzene, divinyltoluene, divinylxylene, divinyl naphthalene, ethylene glycol dimethacrylate or diallyl succinate.

3. The method of claim 1 wherein the halogenating agent is employed at from about 30 to about 150 mole percent and the Friedel-Crafts catalyst is employed at about 2 to about 50 mole percent, said mole percents being based on the total moles of the monovinylidene aromatic monomer employed.

4. A method for increasing the density of a cross-linked haloalkylated monovinylidene aromatic polymer, said method comprising the steps of contacting the haloalkylated polymer with a brominating or chlorinating agent and an acidic halide at conditions sufficient to brominate or chlorinate the haloalkylated polymer such that the density of the haloalkylated polymer is increased and the ratio of the number of haloalkyl groups pendant to the polymers following halogenation to the number of haloalkyl groups pendant to said polymer prior to halogenation is at least about 0.6.

5. The method of claim 1 wherein the halogenation is conducted at a temperature from about $-10°$ C. to about $125°$ C.

6. The method of claim 1 wherein the halogenating agent is bromine or bromine chloride and is employed at from about 50 to about 125 mole percent and the Friedel-Crafts catalyst is ferric chloride, zinc chloride, antimony chloride or aluminum chloride and is employed at from about 5 to about 25 mole percent, said mole percent being based on the total moles of the monovinylidene aromatic employed, and said method is conducted at between about $5°$ C. and about $80°$ C.

7. A method for preparing ion exchange resins from the halogenated polymer of claim 1 said method comprising the step attaching to said halogenated polymer an ion active exchange group.

8. The method of claim 7 wherein the ion exchange resin is an anion exchange resin.

9. The method of claim 8 wherein the ion exchange resin is a weak base anion exchange resin prepared by contacting the halogenated polymer with ammonia or a primary or secondary amine.

10. The method of claim 9 wherein the primary or secondary amine is methylamine, ethylamine, butylamine, cyclohexylamine, dimethylamine or diethylamine.

11. The method of claim 8 wherein the ion exchange resin is a strong base anion exchange resin prepared by contacting the halogenated polymer with a tertiary amine.

12. The method of claim 11 wherein the tertiary amine is trimethylamine, triethylamine, tributylamine, dimethylisopropanolamine or ethylmethyl propylamine.

13. The method of claim 7 wherein the ion exchange resin is a chelate resin.

14. A method for increasing the density of a cross-linked haloalkylated, monovinylidene aromatic polymer, said method comprising the step of contacting the haloalkylated polymer with from about 30 to 150 mole percent of a brominating or chlorinating agent and from about 2 to about 50 mole percent of an acidic halide at conditions sufficient to brominate or chlorinate the haloaklylated polymer such that the density of the haloalkylated polymer is increased, wherein said mole percents being based on the total moles of the monovinylidene aromatic employed.

15. A method for increasing the density of a cross-linked haloalkylated, monovinylidene aromatic polymer, said method comprising the step of contacting the haloalkylated polymer with from about 0.3 to about 1.5 moles of a brominating or chlorinating agent and from about 0.02 to about 0.5 mole of an acidic halide per mole of monovinylidene aromatic employed in preparing the haloalkylated polymer at temperatures from about $-10°$ C. to about $125°$ C. and at conditions sufficient to brominate or chlorinate the haloalkylated polymer such that the density of the haloalkylated polymer is increased.

16. A method for increasing the density of a cross-linked, haloalkylated monovinylidene aromatic polymer, said method comprising the step of contacting the haloalkylated polymer with a brominating, chlorinating or iodinating agent wherein the brominating, chlorinating or iodinating agent is bromine, chlorine, iodine, bromine chloride or iodine chloride and a Friedel-Crafts catalyst wherein the Friedel-Crafts catalyst is a protonic acid or an acidic halide, said contact being conducted at conditions sufficient to brominate, chlorinate or iodinate the haloalkylated polymer such that the density of the haloalkylated polymer is increased and the ratio of the number of haloalkyl groups pendant to the polymer following the halogenation to the number of haloalkyl groups pendant to said polymer prior to halogenation is at least about 0.6.

17. The method of claim 4 wherein the ratio of the number of haloalkyl groups pendant to the polymer following halogenation to the number of haloalkyl groups pendant to said polymer prior to halogenation is at least about 0.85.

18. The method of claim 17 wherein the density of the cross-linked haloalkylated monovinylidene aromatic polymer is increased by at least about 10 percent.

19. The method of claim 1 wherein the halogenating agent is bromine or bromine chloride.

* * * * *